(12) United States Patent
Guyomard et al.

(10) Patent No.: US 6,386,497 B1
(45) Date of Patent: May 14, 2002

(54) DEVICE FOR FIXING A MODULE ONTO A MOTOR-VEHICLE SUPPORT

(75) Inventors: Jean-Nicolas Guyomard, Le Mesnil Fuguet; Christian Rose, Guyancourt; Christian Mahe, Le Tremblay S/Mauldre, all of (FR)

(73) Assignee: Valeo Thermique Moteur, La Verriere (FR)

( * ) Notice: Subject to any disclaimer, the term of this patent is extended or adjusted under 35 U.S.C. 154(b) by 0 days.

(21) Appl. No.: 09/610,682

(22) Filed: Jul. 7, 2000

(30) Foreign Application Priority Data

Jul. 8, 1999 (FR) .............................. 99 08868

(51) Int. Cl.[7] ................................................. A47G 1/10
(52) U.S. Cl. .................................................. 248/316.7
(58) Field of Search .............................. 248/316.7, 314, 248/229.16, 229.26, 231.81; 180/68.4

(56) References Cited

U.S. PATENT DOCUMENTS 5,121,894 A * 6/1992 Twork, Sr. et al. ...... 248/316.7
5,810,311 A * 9/1998 Davison et al. .......... 248/316.7
RE37,092 E * 3/2001 Sharah et al. ................ 362/183

FOREIGN PATENT DOCUMENTS

EP          0 478 403          4/1992

* cited by examiner

Primary Examiner—Ramon O. Ramirez
(74) Attorney, Agent, or Firm—Liniak, Berenato, Longacre & White

(57) ABSTRACT

A module has an end part with at least one fixing pin interacting with fixing means carried by a support of a motor vehicle. A device for fixing the module to the support has an elastic fitting with a hollow for the fixing pin of the module, and a removable member with a first end. The first end has two elastic arms with concavities turned towards one another to clamp the fitting accommodating the fixing pin. The removable member also has a second end for interacting with the fixing means for securing to the support with a degree of freedom of movement chosen to provides for mutual movement of the two arms, in which one of them is moved towards the other.

10 Claims, 1 Drawing Sheet

# DEVICE FOR FIXING A MODULE ONTO A MOTOR-VEHICLE SUPPORT

FIELD OF THE INVENTION

The invention relates to the fixing of a module onto a fixed support of a motor vehicle, in particular a front face.

BACKGROUND OF THE INVENTION

The fixing of a relatively bulky module into the engine compartment of a motor vehicle presents certain difficulties. This is especially the case for heat exchangers, such as cooling radiators, which include a first end part having to be fixed onto first support means, for example a front-face crosspiece, and a second end part having to be fixed onto second support means, for example the chassis.

This type of module comprises fixing pins, on end parts, intended to be inserted into orifices formed in the support means, and holes for accommodating screws intended to immobilize it.

Because of their large dimensions the support means, such as the chassis, exhibit tolerances which may not be compatible with the other support means, such as the front face. The installation of the module may thus require, on the assembly line, a search for a compatible front face, or even an adaptation of the chassis, in extreme cases.

The object of the present invention is to remedy the abovementioned drawback.

SUMMARY OF THE INVENTION

To that end the invention proposes a device for fixing onto support means a module comprising an end part equipped with at least one fixing pin intended to interact with fixing means carried by the support means, and in which, on the one hand, an elastic fitting is provided, of chosen shape, equipped with a hollow for accommodating the fixing pin of the end part, and, on the other hand, a removable member is provided, equipped with a first end including two elastic arms exhibiting concavities turned towards one another in such a way as to clamp the fitting accommodating the fixing pin, and with a second end intended to interact with the fixing means with a view to securing it to the support means with a degree of freedom of movement which is chosen in such a way that it provides for a joint movement of the two arms, in which one of them is moved towards the other.

The removable member thus makes it possible to take up the tolerance discrepancies while facilitating the immobilizing of the module.

In a first preferred embodiment, the member is configured to make it possible to take up the tolerance discrepancies by linear displacement. In order to do this, the fixing means are preferably produced in the form of two parallel grooves and the second end of the member includes a sole plate equipped with two parallel edges forming ribs which are arranged to be inserted by sliding into the grooves.

In a second embodiment, the member is configured to make it possible to take up the tolerance discrepancies by rotation. In order to do this, the second end of the member is of axial shape and comprises clipping means interacting with a housing forming the means of fixing of the support means.

The device according to the invention may comprise other supplementary characteristics possibly being taken separately or in combination, and especially:

two members exhibiting degrees of freedom of movement of the same type, in such a way as to clamp two fittings accommodating fixing pins spaced apart from one another and placed at the same level on an end part of the module;

a fitting exhibiting a generally cylindrical shape, and preferably including, on its outer surface in contact with the arms, a swelling extending substantially parallel to the generatrices of the cylinder.

The invention applies most particularly to the securing of a module, especially of the heat-exchanger type, to a part of a crosspiece of a front face of a motor vehicle.

BRIEF DESCRIPTION OF THE DRAWINGS

An exemplary preferred embodiment of the invention will now be described with reference to the accompanying drawing in which.

DESCRIPTION OF THE PREFERRED EMBODIMENT

Figure 1:
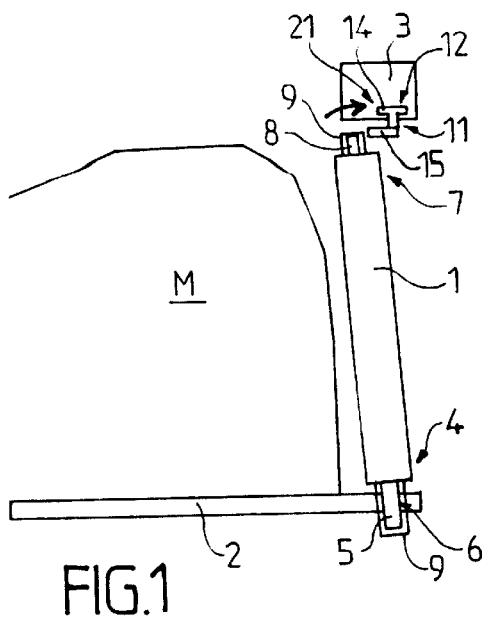
FIG. 1 is a diagram illustrating, in a cross-sectional view, a module of cooling-radiator type in the course of installation into the engine compartment of a vehicle, with the aid of a fixing device according to the invention.

In the various figures, like reference numerals refer to like parts.

In the description which follows, given by way of example, it is a matter of fixing a module of cooling-radiator type into the engine compartment of a motor vehicle. The invention is not limited to the fixing of this type of module alone, however. It especially relates to other heat exchangers, such as supercharging radiators and condensers.

The object of the invention is to allow the fixing of a module onto support means which do not form a single piece. For example, a first end part of a module has to be fixed (or secured) to the structure of the vehicle, such as its chassis, while a second end part, opposite the first one, has to be secured (or fixed) to a part of the front face of this same vehicle.

In what follows, what is described is an application of the invention to the fixing of a heat exchanger, of the cooling-radiator 1 type, onto, on the one hand, the structure of the vehicle and, on the other hand, the crosspiece 3 of the front face of the vehicle. This installation is carried out, as illustrated in FIGS. 1 and 2, within the engine compartment of the vehicle, and more precisely in front of the area occupied by the engine M.

Conventionally, a cooling radiator comprises, in a first end part 4, called "lower" part because of its positioning in the example illustrated, two fixing pins 5 which are intended to be inserted into orifices 6 provided for this purpose in parts of the structure 2 of the vehicle. It moreover comprises, in a second end part 7, called "upper" part, opposite the first end part 4, at least one fixing pin 8, and, more preferably, two fixing pins placed substantially at the same level, but spaced apart from one another.

Figure 2:
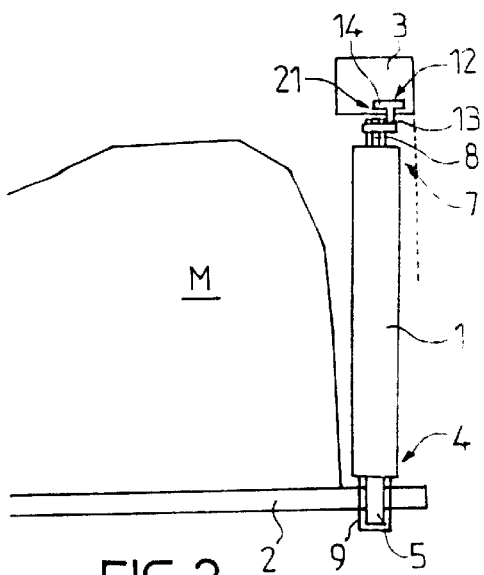
FIG. 2 is a diagram illustrating the module of FIG. 1, once installed.

As the example presented in FIGS. 1 and 2 is a view in cross-section along the median longitudinal axis of the vehicle, only one lower fixing pin 5 and one upper fixing pin 8 are visible on the cooling radiator 1.

Figure 3:
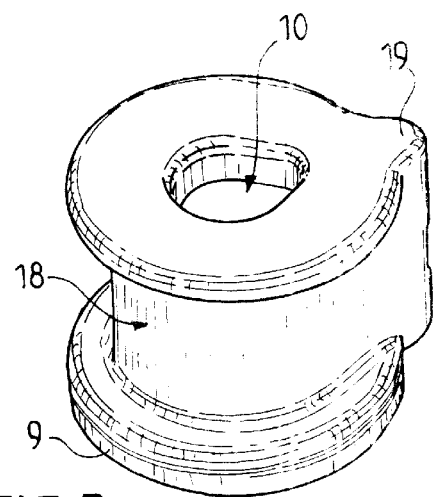
FIG. 3 is a diagram illustrating an elastic fitting.

In order to allow absorption of vibration and of impacts, each fixing pin is surrounded by an elastic fitting. A particular example of an elastic fitting 9 of generally cylindrical shape, which is intended to interact with the fixing device according to the invention, is illustrated in FIG. 3. In the case of the lower fixing pins 5, less elaborate types of elastic fittings can be envisaged.

The installation of the module 1 first of all requires the elastic fittings to be positioned around the fixing pins 5 and 8. In order to do this, the elastic fitting includes a central hollow 10 intended to accommodate the fixing pin.

Once equipped with their elastic fittings, the lower fixing pins 5 are inserted into the orifices 6 of the structure 2, as illustrated in FIG. 1.

Next, it only remains to make the module 1 pivot slightly (in the direction of the arrow of FIG. 1) towards the "upper" fixing device 11, which will be described below, until the upper fixing pins 8, equipped with their elastic fittings 9, are immobilized by this upper fixing device 11 which is itself secured to the crosspiece 3 of the front face.

Figure 5:
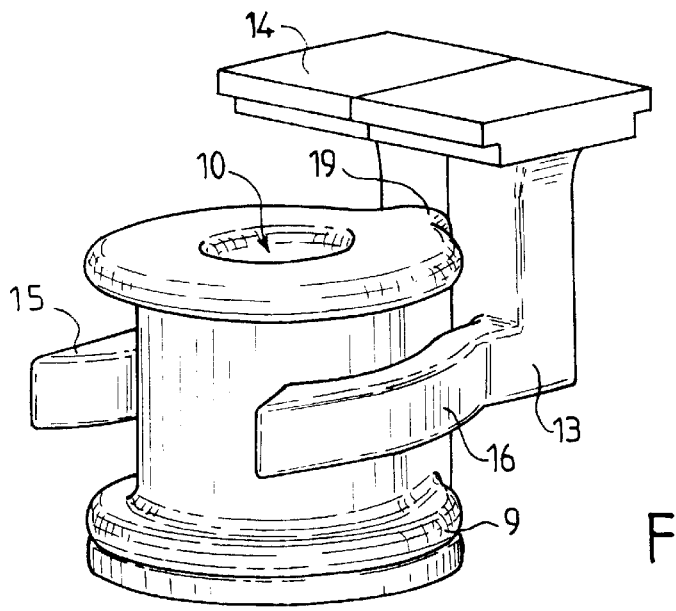
FIG. 5 is a diagram illustrating the removable member of FIG. 4 clamping the fitting of FIG. 3.
Figure 4:
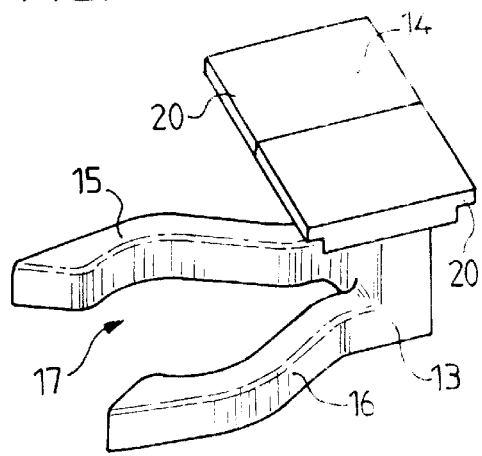
FIG. 4 is a diagram illustrating a first embodiment of the removable member according to the invention.

In FIGS. 4 and 5 is illustrated a first embodiment of a fixing member 13 according to the invention, intended to interact with an elastic fitting of the type illustrated in FIG. 3, as well as with a fixing means 12 of the type illustrated in FIGS. 1 and 2.

In this first embodiment, the upper fixing device 11, according to the invention, thus comprises a removable member 13 equipped with a first end including two elastic arms 15 and 16, exhibiting concavities oriented towards one another, and delimiting a sort of elastic clip 17, and with a second end 14, opposite the first one, in the form of a substantially parallelepipedal "sole plate".

The arms 15 and 16 of the clip 17 each exhibit a shape making it possible to clamp the outer peripheral face 18 of the fitting 9, so as to immobilize it equipped with its upper fixing pin 8.

Preferably, as illustrated in FIG. 3, the fitting includes a swelling 19 on its outer peripheral surface 18, making it possible to facilitate its insertion within the clip 17. The fitting, in this example, exhibiting a generally cylindrical shape, it is preferable for the swelling 19 to be of axial type, and consequently to extend substantially parallel to the generatrices of the cylinder. Moreover, and still preferably, the axial swelling 19 exhibits a V shape, in a cross-sectional view perpendicular to the said generatrices, the open part of the V being oriented towards the central cavity 10.

Because the removable member 13 can slide within the grooves 21, it has available a degree of freedom of movement in translation which makes it possible to take up any tolerance discrepancy between the fixing pins and the fixing means of the structure 2 and of the crosspiece 3 of the front face. This degree of freedom of movement is chosen in such a way that it provides for joint movement of the two arms 15 and 16 in which one of them is moved towards the other, here by translation.

In order to take up a discrepancy, it is sufficient to move (translate) the removable member 13 very slightly within its grooves 21 and thus make it possible to immobilize the upper fixing pin 8 equipped with its fitting 9 within the clips 17 formed by the elastic arms 15 and 16 of each removable member 13.

As the tolerance discrepancies are relatively limited, the movements of the member should therefore likewise be limited. Consequently, in one very advantageous variant, it is the fitting which, because of its swelling 19, spontaneously and automatically moves the removable member 13 when this swelling is not substantially centered on the middle of the gap separating the ends of the two arms 15 and 16.

End-stop means can be envisaged, so as to limit the movements of the member 13.

It is clear that, when the upper end part 7 of the module includes two fixing pins 8 spaced apart from one another, and placed at the same level, two removable members are provided, exhibiting degrees of freedom of movement of the same type.

Clearly, other types of means of securing the upper end of the removable member 13 to the crosspiece 3 can be envisaged, provided that they offer a degree of freedom of movement making it possible to take up a tolerance discrepancy.

Figure 6:
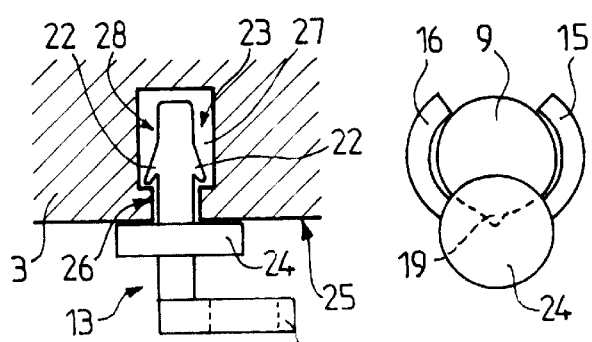
FIG. 6 is a diagram illustrating a second embodiment of the removable member according to the invention, in a side view.
Figure 7:
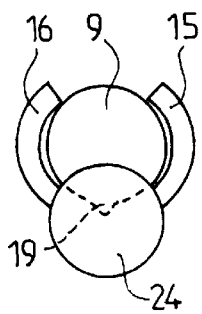
FIG. 7 is a diagram illustrating the removable member of FIG. 6 clamping the fitting of FIG. 3, in a top view.

One such other securing means is illustrated in FIGS. 6 and 7.

In this second embodiment of the removable member 13, the "lower" (or first) end of the removable member 13 still includes two arms 15 and 16 which form a sort of elastic clip 17 of the type described with reference to FIGS. 4 and 5. In contrast, the "upper" (or second) end 28, opposite the lower end, is different.

In fact it is of axial shape, so as to allow a degree of freedom of movement in rotation. In the example illustrated, with a view to securing it to the crosspiece 3 of the front face, it includes clipping means of stud type 22, preferably elastic, intended to be inserted within a housing 23 formed in the crosspiece 3. This housing 23 includes a first part 26 forming a bottleneck with dimensions substantially equal, by upper value, to those of the cross section of the second end of the moveable member 13, which includes the studs 22, and extended by a second part 27 of larger dimensions. In that way, when the studs 22 have penetrated within the wider part 27 of the housing 23, they can no longer be withdrawn because they are locked by the bottleneck 26.

Preferably, and as illustrated in FIGS. 6 and 7, the removable member 13 includes, between the studs 22 and the arms 15 and 16, a sole plate 24 intended to bear on the outer face 25 of the crosspiece 3.

In this second embodiment, in order to take up a tolerance discrepancy, it is sufficient to cause the removable member 13 to move slightly in rotation, in one direction or the other, until the elastic fitting 9 can be inserted, via its swelling 19, between the arms 15 and 16, so as to be clamped there.

As for the first embodiment, the fitting 9 may, because of its swelling 19, spontaneously cause the removable member 13 to move in rotation when this swelling is not substantially centered on the middle of the gap separating the ends of the two arms 15 and 16.

The invention is not limited to the embodiments described above by way of example, but extends to all the variants which the person skilled in the art may develop within the context of the claims below.

Hence, a fixing device has been described making it possible to secure a module to part of a front face of a motor vehicle. However, the device may make it possible, in a more general way, to fix a module to any type of support means connected to the structure of the vehicle, especially longitudinal members or crosspieces.

Moreover, two types of means of securing (rotating and sliding) the removable member onto the support means have been described. However, any type of securing means allowing a degree of freedom of movement could be envisaged.

What we claim is:

1. A device for fixing a module onto support means of a motor vehicle, the said module comprising an end part equipped with at least one fixing pin suitable for interacting with fixing means carried by the said support means, which comprises an elastic fitting, of chosen shape, equipped with a hollow suitable for accommodating the fixing pin of the end part, and a removable member equipped with a first end including two elastic arms exhibiting concavities turned towards one another in such a way as to clamp the said fitting accommodating the fixing pin, and with a second end configured for interacting with the fixing means with a view to securing to the said support means with a degree of freedom of movement which is chosen in such a way that it provides for a joint movement of the two arms, in which one of them is moved towards the other.

2. The device of claim 1, which includes two members suitable for being secured to the said support means with degrees of freedom of movement of the same type, in such a way as to clamp two fittings accommodating fixing pins spaced apart from one another and placed at the same level on the end part of the module.

3. The device of claim 1, wherein the said member is suitable for being secured to a crosspiece belonging to a front face of a motor vehicle and forming the said support means.

4. The device of claim 1, wherein the said fixing means are produced in the form of two parallel grooves and wherein the said second end of the member includes a sole plate equipped with two parallel edges configured to be inserted by sliding into the said grooves while allowing a linear movement of the said member relative to the said support means.

5. The device of claim 1, wherein the said second end of the member is of axial shape and comprises clipping means suitable for interacting with a housing forming the said fixing means and allowing a rotation of the said member relative to the said support means.

6. The device of claim 5, wherein the said member includes, between the said clipping means and the said arms, a radial sole plate intended to bear against an outer surface of the support means, which delimits the said housing.

7. The device of claim 1, wherein the said fitting exhibits a generally cylindrical shape.

8. The device of claim 7, wherein the said fitting includes, on its outer surface intended to be in contact with the arms, a swelling extending substantially parallel to the generatrices of the cylinder.

9. The device of claim 8, wherein the said swelling exhibits a V shape, in a cross-sectional view.

10. Method of using a device for fixing a module of heat-exchanger type, chosen from a cooling radiator, a condenser and a supercharging-air radiator onto support means of a motor vehicle, the said module comprising an end part equipped with at least one fixing pin suitable for interacting with fixing means carried by the said support means, which comprises an elastic fitting, of chosen shape, equipped with a hollow suitable for accommodating the fixing pin of the end part, and a removable member equipped with a first end including two elastic arms exhibiting concavities turned towards one another in such a way as to clamp the said fitting accommodating the fixing pin, and with a second end configured for interacting with the fixing means with a view to securing to the said support means with a degree of freedom of movement which is chosen in such a way that it provides for a joint movement of the two arms, in which one of them is moved towards the other, said method comprising the steps of:

positioning the elastic fitting around the fixing pin;

pivoting the module into fixed position on said support means.

* * * * *